Figure 1:
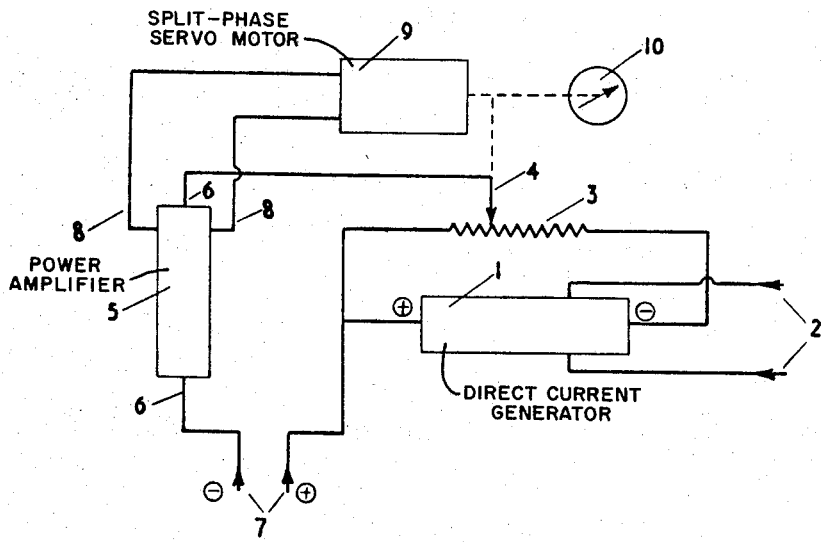

March 5, 1968 P. R. MICHELL ET AL 3,372,332
METHOD AND APPARATUS FOR ELECTRICAL RESISTANCE MEASUREMENT
Filed July 19, 1965 2 Sheets-Sheet 1

Inventors
PETER RALPH MICHELL
FREDERICK GEORGE PACKHAM
By
Cushman, Darby & Cushman
Attorneys

United States Patent Office 3,372,332
Patented Mar. 5, 1968

3,372,332
METHOD AND APPARATUS FOR ELECTRICAL
RESISTANCE MEASUREMENT
Peter Ralph Michell and Frederick George Packham, Runcorn, England, assignors to Imperial Chemical Industries Limited, London, England, a corporation of Great Britain
Filed July 19, 1965, Ser. No. 472,908
Claims priority, application Great Britain, Aug. 12, 1964, 32,850/64
11 Claims. (Cl. 324—30)

The present invention relates to the measurement of electrical resistance. More particularly it relates to a method of measuring the electrical resistance of a circuit element that is carrying a direct current, without drawing current from the circuit element under test and without injecting current into the said circuit element, and to an apparatus therefor.

According to the invention a method of measuring the electrical resistance of a circuit element which is carrying a direct current comprises applying to the voltage input terminals of a voltage-operated current generator a voltage proportional to the said direct current, passing the whole or part of the current output of the said generator through a potentiometer resistor, applying to the input terminals of a voltage amplifier in series opposition to each other the whole or a fixed proportion of the voltage developed across the said circuit element by the said direct current flowing therein and a fraction of the voltage developed across the said potentiometer resistor, said fraction being selected by means of an adjustable tapping on the said resistor, and applying any output from the said voltage amplifier to operate a servo-mechanism adapted when so operated to adjust the said tapping towards a position giving zero output from the amplifier and to show on the scale of an associated indicator a reading corresponding to the position of the said tapping.

Furthermore within the scope of the invention there is provided an apparatus suitable for measuring the electrical resistance of a circuit element which is carrying a direct current, which comprises a voltage-operated direct current generator, a potentiometer resistor having an adjustable tapping, a voltage amplifier, a servo-mechanism and an indicator scale, said voltage-operated current generator being connected for receiving an externally applied first input voltage and for feeding the whole or part of a current output through the said potentiometer resistor, said adjustable tapping on the potentiometer resistor being connected for applying to the input terminals of the said voltage amplifier in series opposition to a second externally applied input voltage a fraction of the voltage developed across the potentiometer resistor, said servo-mechanism being mechanically connected to the said potentiometer tapping and to the said indicator scale and being electrically linked with the output terminals of the said voltage amplifier in such a sense that when there is an output from the voltage amplifier the servo-mechanism moves the tapping on the potentiometer resistor towards a position giving zero output from the amplifier and produces on the indicator scale a reading corresponding to the position of the said tapping.

The indicator scale may be calibrated directly in units of electrical resistance or if desired it may indicate some function of resistance, for example the reciprocal, i.e. conductance units.

The voltage amplifier may be a voltage-operated power amplifier, the output of which is sufficient to operate the servo-mechanism directly, or it may be an amplifier giving a voltage output and be linked to the servo-mechanism by a voltage-power converter.

FIG. 1 of the accompanying drawings shows an apparatus according to the invention in its simplest form. A voltage-operated direct current generator 1 is connected for receiving a voltage input as shown at 2 and for feeding a current output through a potentiometer slide wire 3 having a movable slide tapping 4. A voltage-operated power amplifier 5 has its input terminals 6 connected in series with external voltage input terminals 7, one end of potentiometer 3 and tapping 4. Output terminals 8 of the amplifier are connected to a split-phase servomotor 9 which is mechanically connected (as indicated by the dashed lines) to adjust the position of slide tapping 4 towards a position giving zero output from the amplifier on receipt of a signal from the said amplifier and to indicate on a resistance scale indicator 10 a reading corresponding to the position of slide tapping 4.

The apparatus illustrated in FIG. 1 can be modified so as to be especially suitable for measuring the electrical resistance of a circuit element which is carrying a direct current and which is associated with and inseparable from a series voltage generator of known value, for instance the resistance of the anode-cathode gap in an electrolytic cell. There is known a method of setting an anode in accurately spaced relationship to the cathode surface of a mercury cathode cell electrolyzing alkali metal chloride solution by reference to the electrical conductance of the electrolyte gap between the anode and the cathode in the working cell. The potential drop due to the electrical resistance of the electrolyte gap in a working cell cannot be measured directly since the reversible electrode potentials and the chlorine overvoltage generate a back E.M.F. which is added to the resistive potential drop. However, in such a cell at any fixed electrolyte concentration, cathode amalgam concentration and temperature the reversible electrode potentials and over-voltage can be calculated from known data so that if the potential between anode and cathode is measured a fixed voltage can be subtracted from this to arrive at the resistive potential drop in the electrolyte. The apparatus according to the present invention can be modified so as to substract this fixed voltage automatically when carrying out the resistance measurement. Furthermore, in order to allow connection of potential measuring probes to the cell anode and cathode more conveniently at points remote from the working electrode surfaces that define the electrolyte gap, and if it is required to measure the gap resistance with very great accuracy, it can be arranged that the fixed voltage substracted includes also an allowance for the small potential drop in the anode and cathode structures due to the electrolyzing current passing through these structures from the levels at which the measuring probes are inserted to the working surfaces of the electrodes.

Figure 2:
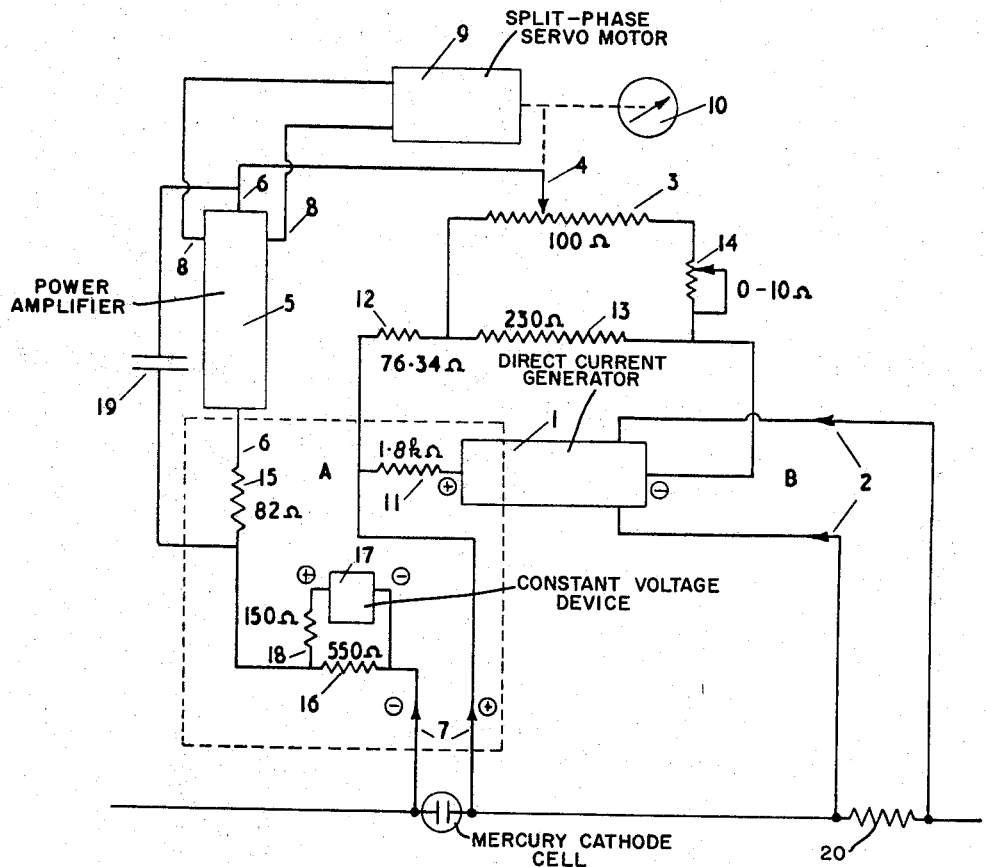

FIG. 2 of the accompanying drawings, in which like parts are numbered as in FIG. 1 shows a preferred arrangement of apparatus according to the invention for measuring the electrical resistance of the electrolyte gap in a working electrilytic cell. The output of current generator 1, which is suitably a "Transdata" amplifier ("Transdata" is a registered trademark) is passed by way of load resistor 11 to resistive network 12 and 13, and a proportion of the current, depending on the resistance value of the slidewire chosen, is passed through slidewire 3 and span-adjusting potentiometer 14. Voltage-operated power amplifier 5 has its input terminals 6 connected to slide tapping 4 and via input resistor 15 to resistor 16 and external voltage input terminals 7 in series. 17 is a constant voltage output device such as a Zener-diode-controlled rectifier unit, and resistors 16 and 18 are chosen so that the voltage developed by current from device 17 across resistor 16 is equal to the fixed voltage which as aforesaid is to be subtracted from the anode-cathode voltage picked up from the electrolytic cell under test. The capacitor shown at 19 and resistor 15 are included to suppress any A.C. ripple which may be superimposed on the D.C. voltage input at terminals 7.

In use, the voltage injected at 7 in FIG. 2 is obtained by suitable connections to the anode and cathode of the electrolytic cell under test and the voltage injected at 2 is a voltage proportional to the electrolyzing current flowing between the anode and the cathode of the cell. We have found that this latter voltage can most readily be provided by two connections fixed at a predetermined distance apart from each other on the copper conductor carrying the electrolyzing current to the anode. In this way a voltage is obtained across a fixed length of the conductor 20 of which the cross-section and resistivity are known at the working temperature. Since the current generator 1 in FIG. 2 has a high input impedance, variations in resistance of the means of connecting the terminals 2 to the copper conductor have a negligible effect. Since, furthermore, the apparatus of the invention is a "null" measuring device of high impedance so that, at the point of balance, there is virtually no current flow at input terminals 7, changes in resistance in the means of connecting terminals 7 to the anode and cathode also have a negligible effect on the measurement obtained.

Figure 3:
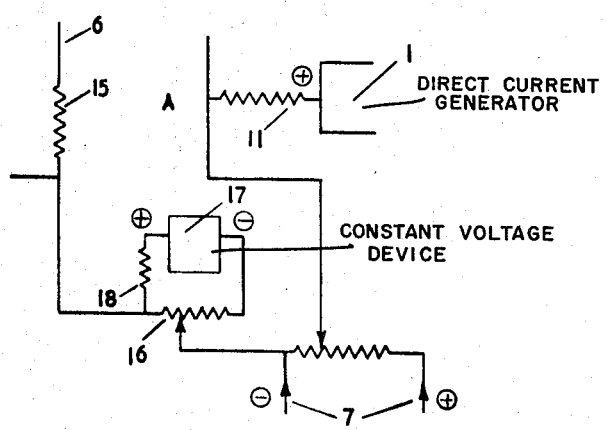

The component values shown in FIG. 2 are suitable for measuring absolute values of resistance in the range 600–1200 micro-ohms with a voltage input of approximately 4 volts at terminals 7, a constant voltage unit giving 4.2 volts output at 17 and an output of about 1 to 5 milliamps from current generator 1. Other ranges may be obtained by altering appropriate component values. Although the arrangement of FIG. 2 does not permit measuring resistance down to zero, this facility can readily be introduced if required by adding another potentiometer arm across the output of current generator 1, linking point A with point B, and taking the positively marked input terminal 7 to an appropriate tapping on this potentiometer instead of to point A, in order to compensate for the voltage drop in resistor 12. Furthermore if the voltage to be injected at 7 is too high for the rating of the circuit components of the measuring apparatus the circuit can be modified so as to divide this voltage and apply only a fraction of it in the amplifier input circuit. At the same time resistor 16 will then be adjusted to divide the subtraction voltage developed thereon in the same ratio. Such a rearrangement of the part of FIG. 2 within the dotted lines is shown in FIG. 3.

What we claim is:

1. A method of measuring the electrical resistance of a circuit element which is carrying a direct current, which comprises applying to the voltage input terminals of a voltage-operated current generator a voltage proportional to the said direct current, passing the whole or part of the current output of the said generator through a potentiometer resistor, applying to the input terminals of a voltage amplifier in series opposition to each other the whole or a fixed proportion of the voltage developed across the said circuit element by the said direct current flowing therein and a fraction of the voltage developed across the said potentiometer resistor, said fraction being selected by means of an adjustable tapping on the said resistor, and applying any output from the said amplifier to operate a servo-mechanism adapted when so operated to adjust the said tapping towards a position giving zero output from the amplifier and to show on the scale of an associated indicator a reading corresponding to the position of the said tapping.

2. A method of measuring the electrical resistance of a circuit element which is carrying a direct current and which is associated with and inseparable from a series direct voltage generator of known value, which comprises applying to the voltage input terminals of a voltage-operated current generator a voltage proportional to the said direct current, passing the whole or part of the current output of the said generator through a potentiometer resistor, applying to the input terminals of a voltage amplifier the whole or a fixed proportion of the total voltage across the circuit element and its associated direct voltage generator and injecting into this input circuit in series opposition to this last said voltage and in series assistance to each other a voltage (A) which in the case where the whole of the said total voltage is applied to the input terminals of the voltage amplifier is equal to the whole of the known voltage of the said direct voltage generator and in the case where a fixed proportion of the said total voltage is applied to the input terminals of the voltage amplifier is equal to the same fixed proportion of the known voltage of the said direct voltage generator and a voltage (B) which is a fraction of the voltage developed across the said potentiometer resistor, said fraction being selected by means of an adjustable tapping on the said resistor, and applying any output from the said amplifier to operate a servo-mechanism adapted when so operated to adjust the said tapping towards a position giving zero output from the amplifier and to show on the scale of an associated indicator a reading corresponding to the position of the said tapping.

3. A method according to claim 2, wherein the said circuit element is the electrolyte gap between an anode and a cathode of a working electrolytic cell.

4. A method according to claim 3 wherein the electrolytic cell is a mercury cathode cell electrolyzing alkali metal chloride solution.

5. An apparatus suitable for measuring the electrical resistance of a circuit element which is carrying a direct current, which comprises a voltage-operated direct current generator, a potentiometer resistor having an adjustable tapping, a voltage amplifier, a servo-mechanism and an indicator scale, said voltage-operated current generator being connected for receiving an externally applied first input voltage and for feeding the whole or part of a current output through the said potentiometer resistor, said adjustable tapping on the potentiometer resistor being connected for applying to the input terminals of the said voltage amplifier in series opposition to a second externally applied input voltage a fraction of the voltage developed across the potentiometer resistor, said servo-mechanism being mechanically connected to the said potentiometer tapping and to the said indicator scale and being electrically linked with the output terminals of the said voltage amplifier in such a sense that when there is an output from the voltage amplifier the servo-mechanism moves the tapping on the potentiometer resistor towards a position giving zero output from the amplifier and produces on the indicator scale a reading corresponding to the position of the said tapping.

6. An apparatus according to claim 5, wherein the said voltage amplifier is a voltage-operated power amplifier and delivers a power output to the servo-mechanism.

7. An apparatus according to claim 5, wherein the output terminals of the said voltage amplifier are electrically linked with the servo-mechanism by way of a voltage-power converter.

8. An apparatus according to claim 5, wherein the said indicator scale is an electrical resistance scale indicator.

9. An apparatus according to claim 5, wherein the said indicator scale is calibrated in electrical conductance units.

10. An apparatus according to claim 5, wherein the servo-mechanism comprises a split-phase servomotor.

11. An apparatus according to claim 5, which includes a constant voltage D.C. generator which is in series with the input terminals of the said voltage amplifier and is connected for applying its voltage in series opposition to the second externally applied input voltage.

No references cited.

RUDOLPH V. ROLINEC, *Primary Examiner.*

C. F. ROBERTS, *Assistant Examiner.*